No. 803,811. PATENTED NOV. 7, 1905.
G. A. CUTTER.
POWER TRANSMISSION DEVICE.
APPLICATION FILED AUG. 14, 1903.

2 SHEETS—SHEET 1.

Witnesses
F. F. Campbell
[signature]

Inventor
George A. Cutter
by H. C. Hart
Attorney.

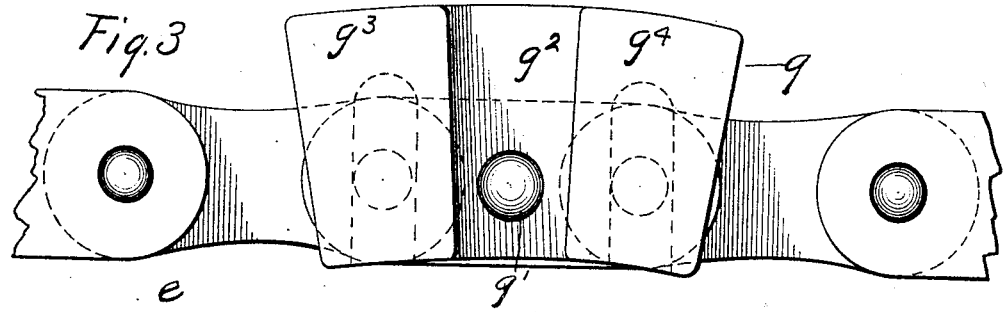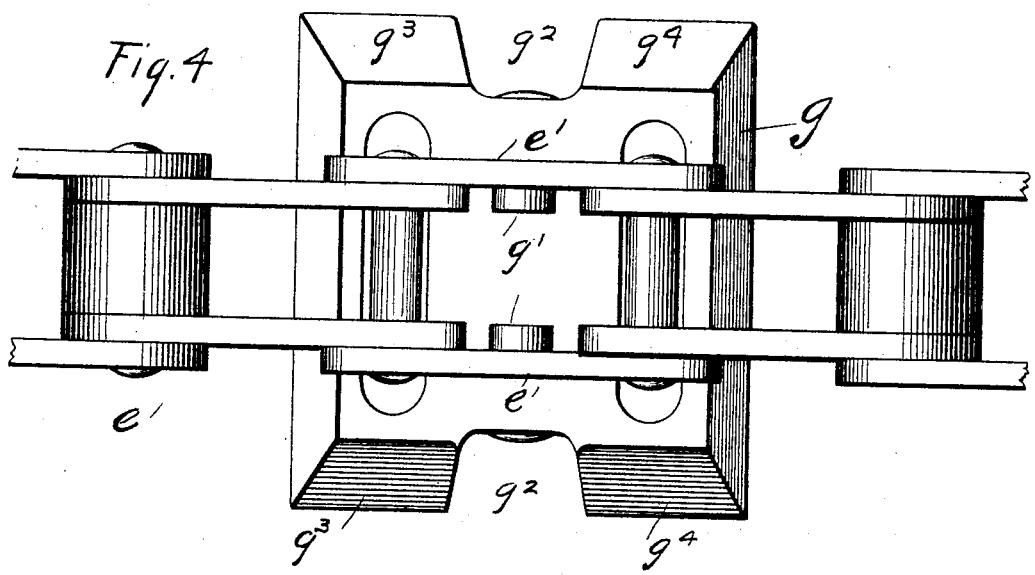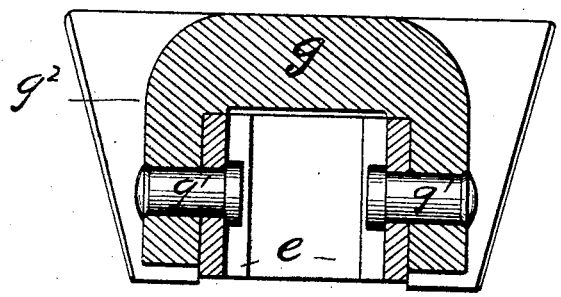

UNITED STATES PATENT OFFICE.

GEORGE A. CUTTER, OF NASHUA, NEW HAMPSHIRE.

POWER-TRANSMISSION DEVICE.

No. 803,811.　　　Specification of Letters Patent.　　　Patented Nov. 7, 1905.

Application filed August 14, 1903. Serial No. 169,456.

*To all whom it may concern:*

Be it known that I, GEORGE A. CUTTER, a citizen of the United States of America, residing at Nashua, in the county of Hillsboro and State of New Hampshire, have invented certain new and useful Improvements in Power-Transmission Devices, of which the following is a specification.

My invention relates more particularly to variable-speed power-transmission devices; and it consists in a novel combination of positive and frictional drives and also in the construction of the driving-belt.

Figure 1:
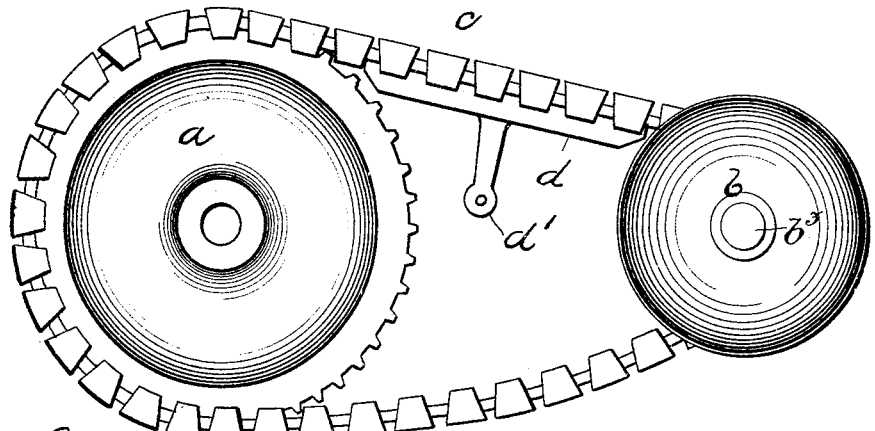
Figure 2:
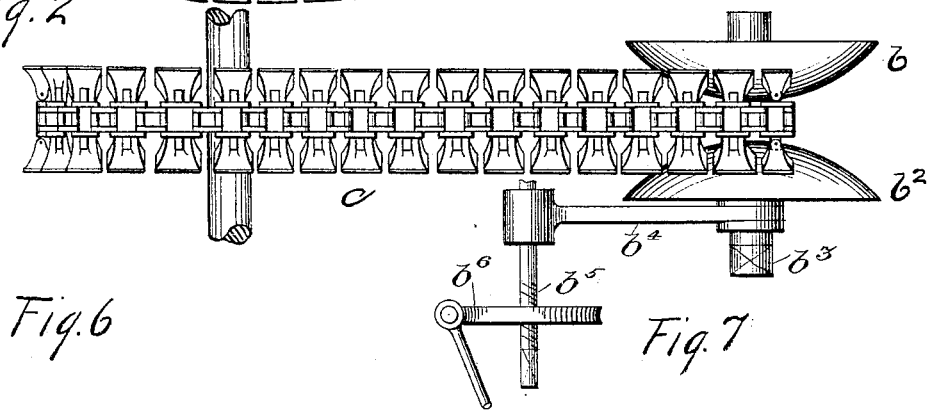
Figure 6:
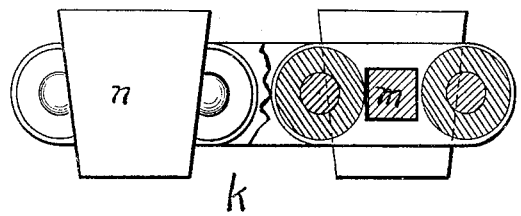
Figure 7:
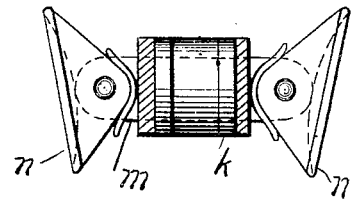

In the drawings, Figure 1 is a view in side elevation of an embodiment of my invention. Fig. 2 is a plan view of the device shown in Fig. 1. Fig. 3 is a side elevation of a driving-belt. Fig. 4 is a bottom view of the same. Fig. 5 is a sectional end view of the same. Figs. 6 and 7 show modifications of the chain construction, one in side view and the other in sectional end view, parts being broken away to show construction.

On the driving and driven shafts I mount two pulleys, one of which is preferably a positive driving-pulley, such as the sprocket-wheel $a$. The other pulley $b$ is made up of the two disks $b'$ $b^2$, at least one of which is preferably mounted to slide on the shaft $b^3$, moved by the arm $b^4$, carried by the sliding bar $b^5$, which is actuated by the gears $b^6$, so that they may be adjusted toward or away from each other, driving by friction. It is apparent that by moving the disks $b'$ $b^2$ toward or away from each other the driving ratio between the pulleys $a$ and $b$ may be altered.

$c$ is the belt connecting the two pulleys, said belt being in the nature of a chain, which will coöperate with the sprocket-wheel teeth, carrying contact-shoes at its sides which coöperate frictionally with the driving-pulley $b$, as clearly indicated in Fig. 2.

I provide a rail $d$ which supports the upper run of the chain and prevents its sagging. This rail is preferably pivoted, as at $d'$, so that it is free to rock as the diameter of the pulley $b$ is altered and the line of travel of the belt changed.

In Figs. 3, 4, and 5 I have illustrated in detail a form of driving-belt which is adaptable for use in connection with this combination of a positive and frictional drive and which has features of novelty and advantage. This belt consists of an ordinary chain $e$, which is adapted to coöperate with the sprocket-wheel. To the side links $e'$ of the chain I secure the shoe $g$ by means of pins $g'$, this shoe being recessed on its under side to fit over the chain, as clearly shown in Figs. 4 and 5. I prefer to cut away the central portions of the sides of this shoe, as shown at $g^2$, in order to provide two active faces $g^3$ $g^4$ on each side, which shall have driving contact with the disks $b'$ $b^2$ of the pulley $b$. These active faces are shaped to fit the shape of the disks $b'$ $b^2$, and by providing two or more active faces on each shoe positive driving contact between the shoes and the disks is assured. Another feature of this method of attachment of the shoes to the chain is that the strain is brought to bear upon the side links and the pins $g'$, relieving to a considerable extent the strain on the chain-pivots.

In Figs. 6 and 7 a modified form of belt is shown, which comprises an ordinary chain $k$ and the bar $m$, passing through the side links, contact members $n$ being pivoted to this bar. This construction also relieves the chain-pivots of excessive strain.

I claim as my invention—

1. In a variable-speed power-transmission device in combination the shafts, a positive driving-pulley on one shaft, an expansible frictional pulley on the other shaft, and a belt coöperating with said pulleys and provided with pairs of oppositely-arranged contact members adapted for coöperation with said expansible pulley.

2. In a variable-speed power-transmission device the shafts, a positive driving-pulley mounted on one shaft and an expansible frictional driving-pulley mounted on the other shaft and having spherically-convex driving-faces, and a suitable belt coöperating with said pulleys and provided with contact members having spherically concave driving-faces adapted to coact with the said expansible pulley.

3. In a variable-speed power-transmission device the combination with the driving and driven shafts, and the driving-pulleys mounted thereon and having means for varying the driving ratio, of a rail pivotally supported at a point between its ends underlying the upper run of the belt, substantially as described and for the purposes set forth.

4. In a power-transmission device the combination with the driving and driven shafts, and the pulleys mounted thereon, of a driving-belt comprising a shoe recessed to fit over the chain and adapted to be secured to the side links thereof, substantially as described.

5. In a power-transmission device the combination with the driving and driven shafts, and the pulleys mounted thereon, of a driving-belt comprising a shoe recessed to fit over the chain and adapted to be secured to the side links thereof, a portion of each side of the shoe being cut away to form two active faces, substantially as described.

6. In a variable-speed or power-transmission device the combination with the driving and driven shafts, a sprocket secured to one of said shafts and adjustable disks secured to the other shaft, of a driving-belt comprising a chain adapted to coöperate with said sprocket, and contact-shoes recessed to fit over said chain and adapted to be secured thereto, each side of said shoes having two active faces for coöperation with said disks.

7. In a variable-speed or power-transmission device the combination with the driving and driven shafts, a sprocket secured to one of said shafts and adjustable disks secured to the other shaft, of a driving-belt comprising a chain adapted to coöperate with said sprocket, and contact-shoes recessed to fit over said chain and adapted to be secured thereto, each side of said shoes having two active faces for coöperation with said disks, said active faces being shaped to fit closely upon said disks.

In testimony whereof I affix my signature in presence of two witnesses.

GEORGE A. CUTTER.

Witnesses:
   B. A. PEASE,
   E. F. INGALLS.